Dec. 29, 1925.

E. HUFF 1,567,055

ELECTRIC LAWN MOWER

Filed March 28, 1925

INVENTOR
ERNEST HUFF
BY HIS ATTORNEYS
Williamson Reift Williamson

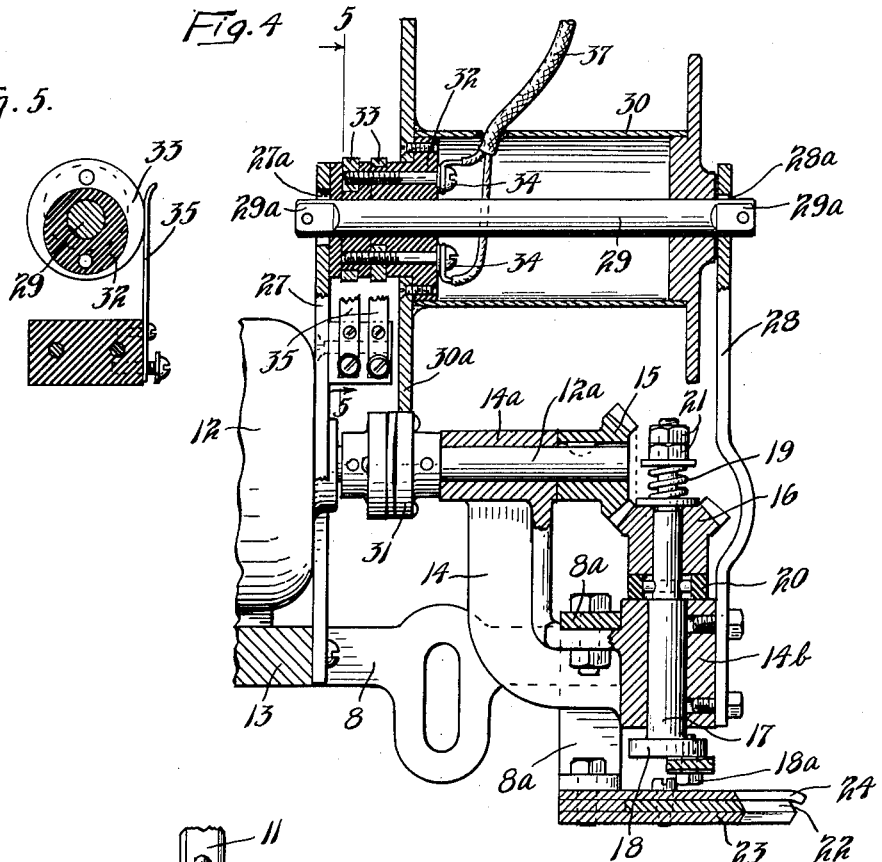

Patented Dec. 29, 1925.

1,567,055

UNITED STATES PATENT OFFICE.

ERNEST HUFF, OF BOYCEVILLE, WISCONSIN, ASSIGNOR TO HUFF MANUFACTURING COMPANY, OF BOYCEVILLE, WISCONSIN, A CORPORATION OF WISCONSIN.

ELECTRIC LAWN MOWER.

Application filed March 28, 1925. Serial No. 18,998.

*To all whom it may concern:*

Be it known that I, ERNEST HUFF, a citizen of the United States, residing at Boyceville, in the county of Dunn and State of Wisconsin, have invented certain new and useful Improvements in Electric Lawn Mowers; and I do hereby declare the following to be a full, clear, and exact description of the invention, such as will enable others skilled in the art to which it appertains to make and use the same.

This invention relates to electric lawn mowers wherein the electrical current is supplied from the ordinary household source, the machine being adapted to be pushed or pulled and the cutting blades driven by an electric motor mounted on the main frame. In such devices, the electricity must be supplied through an elongated flexible electrical conduit, necessitating efficient means for taking up or paying out said conduit as the machine is pushed or pulled over the ground.

An object of this invention is to provide a simple but highly efficient power-driven lawn mower adapted to be easily operated without laborious effort.

It is a further object of the invention to provide an efficient electrically operated lawn mower deriving its source of electricity from the ordinary household light socket through an elongated flexible conduit and carrying efficient automatic means for winding up or paying out said conduit as necessary when the grass is being cut.

It is an additional object to provide a highly efficient lawn mower carrying a reciprocating blade disposed transversely across the front end thereof and driven by an electric motor mounted on the frame.

It is a more specific object to provide an automatic winding reel in such a device, driven by the armature shaft of the motor and adapted to wind up the flexible electrical conduit or permit the same to be unwound as is necessary when the machine is moved across the lawn.

A still further object of the invention is to provide an electric lawn mower, the cutting blades of which are driven by an electric motor through a crank shaft having a slip joint interposed therein to permit the motor to run freely without damaging the blades or other mechanism in case a heavy obstruction is encountered by the blades.

These and other objects of the invention will be apparent from the following description made in connection with the accompanying drawings, wherein like notations refer to similar parts throughout the several views, and in which—

Fig. 3 is a front elevation;

Fig. 4 is a longitudinal vertical section on an enlarged scale of the front portion of the device;

Fig. 5 is a cross section taken on the line 5—5 of Fig. 4;

Fig. 6 is a fragmentary plan view of the blades with some portions broken away; and Fig. 7 is a cross section on an enlarged scale taken on the line 7—7 of Fig. 6.

Figure 1:
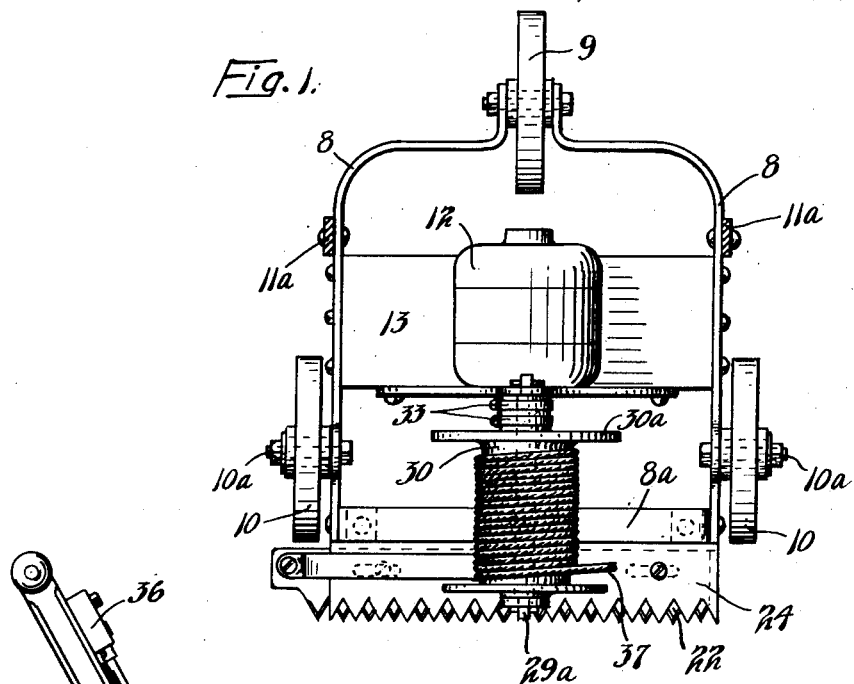
Fig. 1 is a plan view of the preferred form of the device with some parts broken away.

The preferred form of the invention, as illustrated, comprises a main frame of substantially rectangular shape 8 having the horizontally disposed front portion 8$^a$ and the broken rear portion in which the rear wheel 9 is journalled. The front wheels 10 are mounted at the sides of frame 8 on the stub shafts 10$^a$ bolted thereto. A push handle 11 carries the yoke 11$^a$ at its lower end pivotally secured to the rear portions of the sides of the frame 8.

An electric motor 12, suitably mounted on a transverse platform 13, secured to the sides of frame 8, has its armature shaft 12$^a$ extended forwardly to the front end of the machine longitudinally and horizontally of said frame. The outer portion of armature shaft 12$^a$ is journaled in a horizontal bearing 14$^a$ carried by a heavy angular arm 14 which is secured to the front member 8$^a$ of the frame. A beveled gear 15 is keyed to the end of shaft 12$^a$ and engages with the beveled gear 16 rotatably and slidably mounted on the vertical crank shaft 17, the lower portion of which shaft is journaled in the vertical bearing 14$^b$ at the lower horizontal end of the arm 14. The lower end of shaft 17 carries the eccentric disk 18 having the depending crank pin 18$^a$. The beveled gear 16 is yieldingly pressed downwardly by means of the coiled spring 19 into engagement with the friction disk 20 keyed to crank shaft 17. The tension of said spring 19 may be regulated by the lock nuts 21. Thus the crank shaft 17 is frictionally driven from the downwardly pressed beveled gear 16, which construction provides a slip joint between said moving parts, permitting the beveled gear 16 to turn freely in case the crank shaft 17 is prevented from turning.

The cutting mechanism of the lawn mower comprises a reciprocating flat V-toothed cutting blade 22 slidably interposed between a lower stationary flat V-toothed blade 23 and an upper V-toothed guard blade 24, the teeth on blades 23 and 24 being vertically alined and said cutting mechanism being rigidly secured across the front of the machine in horizontal position preferably to the depending angular ends of the horizontal front frame member 8ª. Slots 22ª are provided in the end portions of reciprocating blade 22, through which guide bolts 25 are passed, permitting said blade to reciprocate thereon. A horizontal pitman 26 connects the crank pin 18ª with one end of the reciprocating blade 22.

Figure 2:
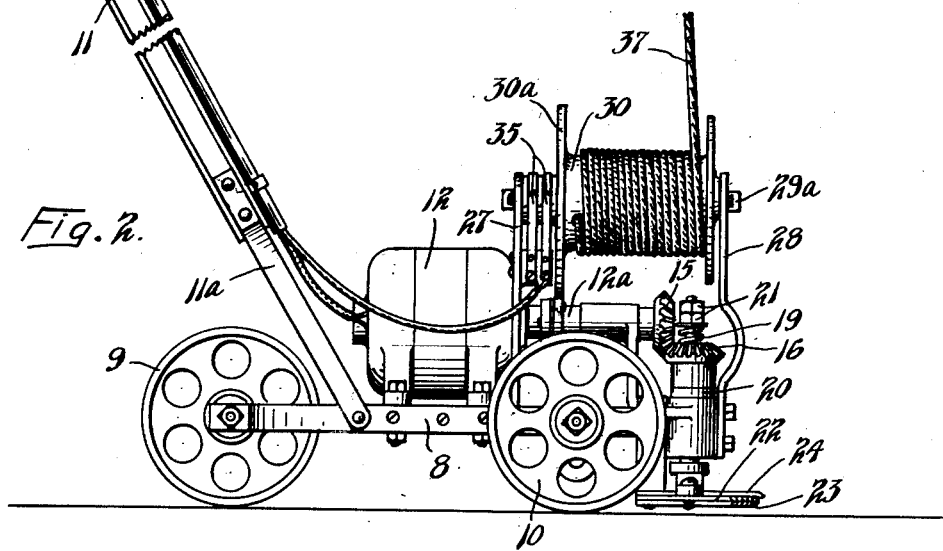
Fig. 2 is a side elevation of the same.

A pair of upright standards 27 and 28 are secured to the front end of platform 13 and the outer side of bearing 14ᵇ, respectively, in vertical alinement. Standard 28 has the aperture 28ª adjacent its upper end, while the standard 27 has the vertical slot 27ª in alinement therewith, and a shaft 29 traverses said standards, passing through the slots 27ª and 28ª, and preferably having the rectangular-shaped ends 29ª conforming to the shape of said slots. Pivotally mounted on said shaft 29 between the standards 27 and 28 a winding reel or drum 30 is disposed, having its rear disk 30ª disposed directly above a split friction disk 31 keyed to the armature shaft 12ª. The rear drum disk 30ª engages friction disk 31 as shown in Figs. 2 and 4 and will be driven thereby when the drum 30 is substantially in horizontal position, normally disposed in such position by the force of gravity. Obviously, when any upward force is applied to the drum 30, the rear end of shaft 29 will be raised and the drum disk 30ª will be disengaged from the friction disk 31.

A hub of insulation material 32 is carried by the rear portion of the drum 30 carrying the spaced contact rings 33 to each of which is connected an electric terminal 34. Brushes 35, electrically connected to motor 12, engage contact disks 33, thus supplying the electric current to said motor through the switch 36 mounted in convenient manipulating position on the upper end of the push handle 11. An elongated flexible electrical conduit 37 is suitably secured at one end to drum 30 having its terminals made fast to the terminals 34. The other end of flexible conduit 37 is provided with a standard connection plug, not shown, adapted to be readily engaged by the ordinary household lighting socket. The conduit 37, as illustrated in the drawing, is adapted to be wound on or paid out by reel 30.

The cutting blades 22 and 23 have their V-shaped notches beveled on the outer sides thereof and the blades may consequently be easily sharpened by removing and grinding the smooth surfaces thereof.

The operation of the electric lawn mower is probably obvious but may be briefly summarized as follows:

The outer end of the conduit 37 is first secured to a household light socket, the conduit preferably extending from a window or portion of a house, or other object above the level of the ground. The machine is then pushed over the ground, the current being supplied to the motor when the switch 36 is turned on. The reciprocating blade being directly geared to the armature shaft 28, reciprocates at very high speed, thereby efficiently cutting the grass in its path. As the machine is pushed over the ground, tension is applied to the top of the drum 30 from the conduit 37 and the rear end of said drum is raised thereby, the shaft 29 moving upward in the slot 27ª and thereby disengaging the rear disk 30ª of the drum from engagement with the friction disk 31 on the armature shaft. Obviously, the conduit 37 will be paid off from the reel as required when tension is put thereon.

On the other hand, when the lawn mower is pushed towards the source of electricity, the disk 30ª will engage the friction disk 31 and be driven thereby, winding up the drum and taking up the slack in conduit 37. This automatic winding reel, therefore, co-operates to provide a successful, efficient lawn mower, permitting the electricity to be supplied from the ordinary household light socket.

The slip joint afforded by the frictional engagement of the spring pressed loosely pivoted beveled gear 16 on the frictional guide disk 20 of crank shaft 17, prevents the stripping of gears or breakage of parts when a stone, stick or other obstacle is encountered in the blades, permitting the beveled gear 16 to turn freely.

Obviously, little effort is required to push this improved lawn mower over the ground while the results obtained thereby are highly successful, as shown by actual reduction to practice.

From the foregoing description, it will be apparent that an efficient electric lawn mower has been invented comprising few parts and capable of being manufactured at small cost.

It will, of course, be understood that various changes may be made in the form, details, proportions and arrangement of parts without departing from the scope of the invention.

What is claimed is:

1. An automatic winding reel for electric lawn mowers and other power driven devices employing a flexible connection member, having in combination a rotary driving means and a rotatable drum to which one end of said flexible connection is secured, said drum having driving engagement with said driving means when said flexible connection is slack and being automatically disengaged therefrom when said flexible connection is taut to permit unwinding thereof.

2. An automatic winding reel for electric lawn mowers and other power driven devices employing a flexible connection member, having in combination a frame, a rotary driving shaft, a rotatable drum slidably journalled in said frame and having driving engagement with such shaft, and a flexible connection secured at one end of said frame, whereby when slack is present in said flexible connection, driving engagement will be made and when said connection is taut said drum will be disengaged from said shaft.

3. An automatic winding reel for electric lawn mowers and other power driven devices employing a flexible connection member, having in combination a frame, a rotary driving shaft mounted therein, a rotatable drum slidably journalled in said frame, a flexible connection secured at one end to said drum and said drum having a flange adapted to engage said rotary shaft for driving when said connection is slack and adapted to be moved from engagement with such shaft when said connection is taut, whereby said drum will wind or pay out as desired.

4. The structure set forth in claim 5 and said drum being mounted above said driving shaft for vertical slidable movement, whereby gravity will normally engage said flange thereof with said shaft.

5. An automatic winding reel for electric lawn mowers and other power driven devices employing a flexible connection member, having in combination a rotary driving shaft mounted in said frame, a rotatable drum journalled in said frame, one end of said drum being mounted for slidable movement in a line normal to the axis of said shaft, a flexible connection secured at one end to said drum and said drum having a circular flange adjacent the slidable end thereof adapted to engage said rotary shaft for driving when said flexible connection is slack and adapted to be disengaged therefrom when said flexible connection is taut, whereby said drum will wind or pay out as desired.

In testimony whereof I affix my signature.

ERNEST HUFF.